Nov. 15, 1932.   L. PROPP   1,887,784
ELECTRIC OUTLET SOCKET
Filed Sept. 1, 1927
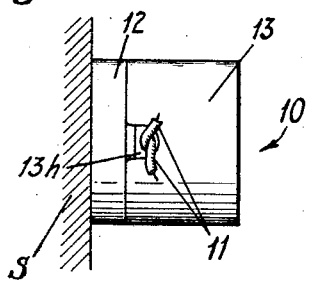
Fig. 1
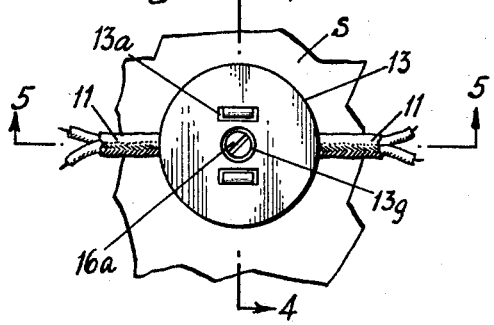
Fig. 2
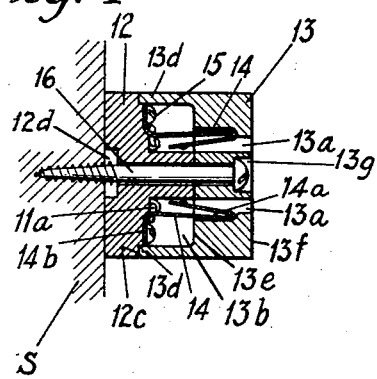
Fig. 4
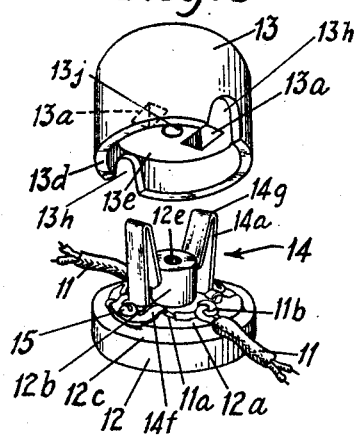
Fig. 3
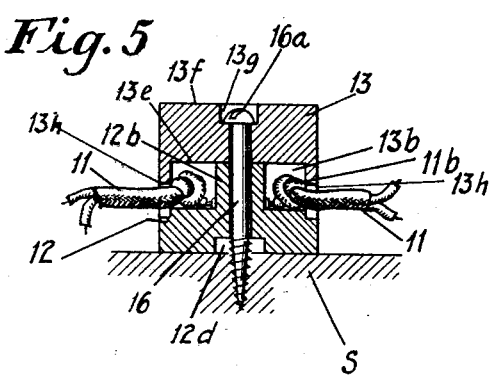
Fig. 5
Fig. 6
Louis Propp
INVENTOR
BY
ATTORNEY Patented Nov. 15, 1932

1,887,784

UNITED STATES PATENT OFFICE

LOUIS PROPP, OF NEW YORK, N. Y., ASSIGNOR TO THE M. PROPP CO. INC., OF NEW YORK, N. Y., A CORPORATION OF NEW YORK

ELECTRIC OUTLET SOCKET

Application filed September 1, 1927. Serial No. 216,835.

This invention relates to electrical outlet fittings and is directed to the provision of a utility tapping device for connecting a branch circuit, as, for example, an electric appliance or decorative lighting outfit, in parallel with feed conductor wires of a portable service line.

Among the objects of this invention is generally to improve the construction of fittings of this character so as to provide a neat, compact, and rugged structure, highly practical and efficient, comprised of few and simple parts, easily and quickly assembled, and adapted to be readily installed on feed wires for permitting simple and quick connecting and disconnecting of branch circuits.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Figs. 1 and 2 are side and front elevational views respectively of a utility tap fitting embodying the invention;

Fig. 3 is a perspective view of the improved fitting showing the cover portion separated from the base to expose the interior construction;

Figs. 4 and 5 are cross-sectional views taken on line 4—4 and 5—5 respectively in Fig. 2; and Fig. 6 is a perspective view of one of the current carrying members.

Referring in detail to the drawing, 10 denotes a utility tap fitting embodying the invention, shown applied to feed conductor wires 11 which extend from a suitable electric power source (not shown). One or more of said fittings may be attached along the feed wires 11 at any desired point to provide plugging means for detachably connecting in parallel at each fitting the usual cap-plug terminating a portable or branch circuit (not shown).

The fitting 10 here shown comprises a cylindrical base 12 and cover 13, both preferably molded from suitable insulating material, and spaced current carrying members 14 formed of spring sheet metal, secured to project upwardly from the top side 12a of said base portion, and to extend into passage 13a provided in said cover.

As seen in Figs. 3 and 4, a boss 12b projects upwardly from said top side 12a and axially thereof, said boss serving to separate the current carrying members 14 and also to brace the fitting structure as will hereinafter more fully appear.

The cover is recessed to provide a chamber 13b into which the boss 12b, together with the anchored ends of the current carrying members 14, and portions of the feed wires 11 connecting with said members is received, the end periphery of the annular chamber wall 13d being adapted to seat on a shoulder 12c extending around the rim of the top side 12a for aligning the base and cover. The passages 13a extend through the bottom wall 13e of the chamber to the top side 13f of the cover. Each passage 13a has extending thereinto the spring contact terminal 14a of a current carrying member. Said passage provides a socket to receive a contact blade of a cap-plug (not shown) inserted into said passage for engaging said terminal in the well understood manner.

The current carrying members 14 may be rigidly fastened to the base 12 in any suitable manner, as by means of a screw 15 passing through a perforation 14c provided in a foot extension 14b of said member. Each of said current carrying members 14 comprises a spring contact terminal 14a upstanding therefrom and extending substantially at right angles thereto. The terminal 14a is folded back on itself so that the bight 14g of the folded portion provides a smooth means to guide a contact blade of a cap-plug into engagement with said terminal, said bight also assisting in forming the latter into a resilient structure.

To provide suitable means on member 14 to engage a bared portion 11a of the conductor wire 11, the foot extension 14b may be made wider than the terminal 14a, the portions of said extension projecting beyond the sides of the terminal being cut from extension 14b and bent to form the spring clips 14f. Thus, when these clips are forced down against the bared wire 11a, which has previously been extended along the foot extension 14b and inserted under the spring clip 14f, as shown in Figs. 3 and 4, it is held firmly in position, making positive electrical contact with member 14.

For mounting the fitting 10 on a support S, a fastening wood screw 16 may be passed through aligned openings 12e and 13j, through said base and cover respectively, said openings preferably being axial of said parts. It will be seen that said screw acts simultaneously to hold the base and cover together and to retain the fitting on the support. The cover 13 may be countersunk at 13g to receive the head 16a of the wood screw.

Where the fitting 10 is applied to a portable circuit, such as a Christmas tree lighting outfit, a machine screw and nut (not shown) may be used in place of the wood screw 16. In this case it is desirable to countersink the base portion 12 as at 12d for receiving the nut of the machine screw so that no parts of the fastening means project beyond the surface of the fitting.

In order to prevent injury to the cover and base when tightening said fastening screw, the boss 12b is extended to abut the bottom wall 13e of the chamber so as to form a spacing bracer for reinforcing the fitting structure as is clearly shown in Figs. 4 and 5.

Diametrically opposed cut away portions 13h are provided at the bottom of the cover through which the feed wires 11 pass in and out of the chamber 13b. The latter is preferably made large enough to house knots 11b tied on said feed wires and said knots are adapted to engage the rim edges of said cut away portions to provide a strain relief for the connection of the feed wire 11 with the members 14.

From the above description and the drawing, it is apparent that the installation of the improved fitting 10 is a very simple matter. With the current carrying members 14 secured to the base 12 and cover 13 dismounted from the base, the feed wires 11, which have previously been prepared with the bared portion 11a and knots 11b at a point where it is desired to apply the fitting, are connected to said members by slipping the bared wire portion 11a under the clips 14f to extend along the foot extension 14b as shown in Fig. 3. The cover 13 is then mounted on the base portion 12 and the fastening screw 16 applied to retain the fitting parts assembled, ready for use as an outlet adapted to connect with a cap-plug terminating in a branch circuit, in the well understood manner. The wires 11 are here shown as comprising parts of a single duplex conductor cable, but it is to be understood that the fitting shown may be used with equal facility in connection with two wires 11, not bound into a single cable.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:—

1. An electric fitting, having an insulating base, a current carrying member comprising a spring contact terminal and a foot extension, said extension being bent to retain the terminal in an upstanding position on said base, means for fixing said extension to said base and spaced spring clips on opposite sides of said extension adapted to engage a conductor wire.

2. In combination with an electric fitting having an insulating base, a current carrying member anchored by one end secured to the base, the other end being bent to upstand from said base and serving as a spring terminal, spaced edges of the anchored end extending beyond said terminal being cut and bent to form spring clips adapted to engage and hold a conductor wire.

3. An electric fitting of the character described comprising a body having an insulating base, a cover seated on said base, and a one-piece current carrying member within said body, said member comprising a foot extension means for securing said extension to said base, a spring contact terminal extending from said base and spaced spring clips on opposite sides of said extension adapted to engage and hold a conductor wire, said cover having a passage into which said contact extends, and aligned openings to permit conductor wires to extend into said body.

In testimony whereof I affix my signature.

LOUIS PROPP.